United States Patent [19]

Okuyama et al.

[11] Patent Number: 5,578,255
[45] Date of Patent: Nov. 26, 1996

[54] METHOD OF MAKING CARBON FIBER REINFORCED CARBON COMPOSITES

[75] Inventors: Kouhei Okuyama; Kazuo Niwa; Toshihiro Fukagawa, all of Sakaide, Japan

[73] Assignee: Mitsubishi Chemical Corporation, Japan

[21] Appl. No.: 406,786

[22] Filed: Mar. 20, 1995

Related U.S. Application Data

[63] Continuation of Ser. No. 896,009, Jun. 9, 1992, abandoned.

[51] Int. Cl.⁶ .............................. C01B 31/00; D01F 9/12; B32B 31/04; B27N 3/10
[52] U.S. Cl. .......................... 264/29.5; 57/907; 156/62.4; 264/60; 264/109; 264/257; 264/258; 264/29.1; 423/447.1; 526/341
[58] Field of Search .......................... 57/907; 264/29.5, 264/60, 109, 257, 258, 29.1; 423/447.1; 526/341; 428/408; 156/62.4

[56] References Cited

U.S. PATENT DOCUMENTS

| | | |
|---|---|---|
| 3,002,804 | 10/1961 | Kilian . |
| 3,846,833 | 11/1974 | Ram et al. ................ 526/341 |
| 3,927,157 | 12/1975 | Vasterling ................. 264/29.1 |
| 4,134,882 | 1/1979 | Frankfort et al. . |
| 4,350,672 | 3/1982 | Layden, Jr. et al. ........... 264/29.1 |
| 4,425,293 | 1/1984 | Vassilatos . |
| 4,555,393 | 11/1985 | Sorensen et al. .......... 423/447.1 |
| 4,565,727 | 1/1986 | Giglia et al. ................ 428/408 |
| 4,835,053 | 5/1989 | Stanko . |
| 4,909,976 | 3/1990 | Cuculo et al. . |
| 4,975,326 | 12/1990 | Buyalos et al. . |
| 5,019,316 | 5/1991 | Ueda et al. . |
| 5,033,523 | 7/1991 | Buyalos et al. . |
| 5,049,447 | 9/1991 | Shindo et al. . |
| 5,137,670 | 8/1992 | Murase et al. . |
| 5,149,480 | 9/1992 | Cuculo et al. . |
| 5,171,504 | 12/1992 | Cuculo et al. . |
| 5,182,068 | 1/1993 | Richardson . |
| 5,186,879 | 2/1993 | Simons et al. . |
| 5,234,764 | 8/1993 | Nelson et al. . |
| 5,268,133 | 12/1993 | Cuculo et al. . |

FOREIGN PATENT DOCUMENTS

| | | |
|---|---|---|
| 670932 | 9/1963 | Canada . |
| 62-119288 | 5/1987 | Japan ................ C09K 3/14 |
| 62-96364 | 5/1987 | Japan ................ C04B 35/52 |

*Primary Examiner*—James Withers
*Attorney, Agent, or Firm*—Nixon & Vanderhye

[57] ABSTRACT

Disclosed herein is a method for preparing carbon fiber reinforced carbon composites comprising:

- subjecting short fibers composed of bundles of multiple single fibers to dry or wet fibrillation;
- preparing a sheet oriented in the two-dimensional random direction; and
- after impregnating the obtained sheet with resins pitches and laminating the sheet followed by molding, subjecting the molded product to baking and densification treatments.

12 Claims, No Drawings

METHOD OF MAKING CARBON FIBER REINFORCED CARBON COMPOSITES

This is a Rule 62 File Wrapper continuation of application Ser. No. 07/896,009, filed Jun. 9, 1992, now abandoned.

BACKGROUND OF THE INVENTION

The present invention relates to carbon fiber reinforced carbon composites which are excellent in strength and friction properties, and a method for preparing the Generally, carbon fiber reinforced carbon composites (referred to as "C/C composites" hereinafter) are prepared by impregnating into or mixing with long or short carbon fibers such as PAN based carbon fibers, pitch based carbon fibers and rayon based Carbon fibers, etc. thermosetting resins such as phenol resins, furan resins, etc. or thermoplastic resins such-as pitches, etc., hot-molding the impregnated or mixed material, baking the thus obtained products at a temperatures of 600° to 2500° C. under non-oxidizable atmosphere, and then densifying them.

As the methods for preparing C/C composites composed of short carbon fibers, there may be mentioned a method in which a solvent and a carbon fiber are mixed by a mixer, the resultant mixture is matted by a screen, and then pressure is applied to the thus-obtained mat for preparing a porous carbon electrode (Japanese Patent Application Laid-Open (KOKAI) Nos. 54-41295 and 57-129814); a method in which a solvent and carbon fibers having different length are mixed in a mold by ultrasonic vibration (Japanese Patent Application Laid-Open (KOKAI) No. 58-30537); a method in which a short fiber in the form of mat is laminated, and after impregnating with resins or pitches, the laminate is molded (Japanese Patent Application Laid-Open (KOKAI) No. 62-119288); a method in which a short Carbon fiber is dispersed uniformly by applying a beating-treatment in a solvent, and then the solvent is removed, thereby obtaining an aggregate of carbon fiber orientated in a random direction (Japanese Patent Application Laid-Open (KOKAI) No. 62-96364); and a method in which a short fiber and a solvent are supplied into a frame having a large number of pores in the bottom for drawing solvents, and after dispersing uniformly, the solvent is drawn to form a preform (Japanese Patent Application Laid-Open (KOKAI) No. 1-176273).

Since by the method described in Japanese Patent Application Laid-Open (KOKAI) No. 62-119288, since a matted short fiber is laminated and resins or pitches are impregnated therein, each sheet of the matted short fiber is insufficiently impregnated with resins or pitches. As a result, it is difficult to mold comparatively thick samples, large void pores (holes) are easily made between carbon fibers or between the laminated carbon fibers layers, and thus-obtained composites are inferior in strength. Then, there is a problem that irregular distribution of carbon fibers easily arise during preparation of heavy preforms in the method described in Japanese Patent Application Laid-Open (KOKAI) Nos. 62-96364 and 1-176273. Further, there are problems that by other methods, since fibers are oriented in the pseudo-three-dimensional direction, irregular distribution of carbon fibers and local void pores are easily produced, the strength thereof is uneven, and even when the fibers are used as friction materials or sliding materials, uniform characteristics cannot be obtained.

As a result of earnest research to overcome these problems, it has been found that by subjecting short carbon fibers to dry or wet fibrillation to prepare sheets oriented in the two-dimensional random direction, impregnating resins or pitches into the sheets, laminating and molding the impregnated sheets, and then subjecting to baking and densification, the thus-obtained C/C composites have good mechanical strength and are excellent in friction properties. The present invention has been achieved on the basis of this finding.

SUMMARY OF THE INVENTION

In a first aspect of the present invention, there is provided a method for preparing carbon fiber reinforced carbon composites comprising:

subjecting short fibers composed of bundles of multiple single fibers to dry or wet fibrillation;

preparing a sheet oriented in the two-dimensional random direction; add after impregnating the obtained sheet with resins or pitches and laminating the sheet followed by molding, subjecting the molded product to baking and densification treatments.

In a second aspect of the present invention, there is provided carbon fiber reinforced carbon composites produced by subjecting short fibers composed of bundles of multiple single fibers to dry or wet fibrillation; preparing a sheet oriented in the two-dimensional random direction; and after impregnating the obtained sheet with resins or pitches and laminating the sheet followed by molding, subjecting the molded product to baking and densification treatments.

In a third aspect of the present invention, there is provided a carbon fiber reinforced carbon composites having a tensile strength of not less than 6 Kg/mm$^2$, a compression strength ($//$) of not less than 12 Kg/mm$^2$, a compression strength ($\perp$) of not less than 8 Kg/mm$^2$, and an wear of not more than 0.40 μm/stop/surface.

DETAILED DESCRIPTION OF THE INVENTION

Any carbon fibers such as pitch based carbon fibers, PAN based carbon fibers or rayon based carbon fibers can be used in the present invention. If necessary, SiC, Al$_2$O$_3$, inorganic particles such as carbon black, inorganic materials and the like may be contained in the carbon fibers.

As the forms of carbon fibers to be used, tow, strand, roving, yarn and the like may be exemplified. The short fibers obtained by cutting these carbon fibers are preferably used. These short fibers are formed from bundles of plural single fibers. The short fibers of usually 0.3–100 mm, and preferably about 5–50 mm may be used in the present invention. For producing the C/C composite, it is necessary to fibrillate the short fibers, thereby obtaining a dispersion thereof, to prepare two-dimensional random sheets, and to fill matrix materials therebetween in order to improve their properties in the present invention.

In the present invention, the said bundles of short fibers are subjected to dry or wet fibrillation to disperse them and then two-dimensional random sheets is prepared.

As the methods for preparing the sheets oriented in the two-dimensional random direction by dry fibrillation; a method comprising making carbon fibers be monofilaments mechanically to prepare sheets, using a random weber which is usually used in spinning industry; and a method comprising fibrillating carbon fibers by air and preparing sheets may be exemplified.

As the methods for preparing the sheets oriented in the two-dimensional random direction by wet fibrillation, a method comprising fibrillating short carbon fibers in a solvent by using a beater which is usually used in beating treatment of pulp or using a pulper which is used in fibrillation treatment; supplying in small portions to a frame having a screen in the bottom or dispersing uniformly them by means of stirring and the like; preparing sheets by a woven wire; and drying the sheet may be exemplified.

As a solvent which uniformly disperses short carbon fibers, water, acetone, alcohols having carbon atoms of 1 to 5, anthracene oil and the like are preferably used, and also other organic solvents may be used.

If phenol resins, furan resins, pitches and the like are dispersed or dissolved in these solvents, an adhesion of carbon fibers each other preferably makes the handling in the next step be easy. Further, if thickening agents such as sodium cellulose-glycolate, polyvinyl alcohol and hydroxy-cellulose are added, the effect thereof is more preferably increased.

The weight of the carbon fiber sheep, prior to impregnation with the matrix material, is not limited but preferably it is in the range of 10 to 500 grams per square meter ($g/m^2$).

The thus-obtained sheets oriented in the two-dimensional direction are impregnated with a matrix whose viscosity is appropriately adjusted by dissolving phenol resins, furan resins, petroleum pitches, coal pitches and the like in solvents such as alcohol, acetone and anthracene oil, and then dried. The amount of the matrix which is impregnated to a sheet is 1 to 3,000 $g/m^2$, preferably 5 to 1,500 $g/m^2$ of a resin or melt pitch based on 200 $g/m^2$ of the carbon fibers.

Then, these dried sheets are laminated and filled into a mold, and subjected to pressure-molding under 1 to 300 $kg/cm^2G$ at a temperature of 50° to 500° C., preferably 100° to 450° C. to obtain molded product having $V_f$ (fiber volume content) of 5–65%, preferably about 10 to 55%. Thereafter, the molded products are baked at temperature of 800° to 2500° C., at a temperature-increasing rate of 1° to 200° C./h under atmosphere of an inert gas such as $N_2$ gas, to obtain C/C composite materials.

These baked C/C composite materials are appropriately subjected to densification-treatment by the following method(s) singly or in combination thereof to further improve strength.

1. Densification-treatment using resins or pitches

After the said C/C composite materials are placed in a vessel which is heated to the predetermined temperature and whose inner pressure is reduced (e.g., not more than 1 Torr), the matrixes of the same resin or melt pitch as in the said impregnation process are supplied to the vessel, and the matrixes are impregnated in the void of the C/C composite materials which was produced by baking. The C/C composite materials are then baked at a temperature of 800° to 2500° C. again. The said densification treatment is repeated in order to obtain the desired C/C composites.

2. Densification-treatment using CVD

After the said C/C composite materials placed in a reaction vessel are heated to a temperature of, for example, 300° to 1,500° C., a vapor of hydrocarbons or halogenated hydrocarbons is supplied to the reaction vessel with $H_2$ gas., Ar gas or $N_2$ gas. The void of the C/C composite materials is impregnated with heat-decomposed carbons which are produced therein, so that the C/C composite materials are densified. If necessary, a graphitization treatment may be performed. The thus obtained C/C composite of the present invention have a tensile strength of not less than 6 $Kg/mm^2$, a compression strength (//) of not less than 12 $Kg/mm^2$, a compression strength (⊥) of not less than 8 $Kg/mm^2$, an wear of not more than 0.40 μm/stop/surface, and a porosity of not more than 15%.

The C/C composites in the present invention in which, short carbon fibers are uniformly disposed in two-dimensional random without local void pores, have excellent properties of small variations in friction properties and strength.

The method according to the present invention can easily produce the C/C composite having excellent friction properties such as brake sliding and sufficient strength, in which short carbon fibers are dispersed uniformly in the two-dimensional random form.

EXAMPLES

The present invention is illustrated with reference the following examples, but the invention is not intended to be limited only to these following examples.

Example 1

A pitch based carbon fiber having 4000 filaments which were cut by 10 mm in length was fibrillated by a random weber to obtain a sheet having carbon fiber weight per unit area of 200 $g/m^2$ and being oriented in the two-dimensional random direction. The sheet was impregnated with a phenol resin which is diluted with ethanol, and dried to prepare a sheet impregnated with 130 $g/m^2$ of the phenol resin based on 200 $g/m^2$ of the carbon fiber sheet. The sheet was superposed in a mold, and applied to pressure molding at 250° C. to obtain a molded product having $V_f$ of 50%. After graphitization in a heating furnace up to 2000° C. the molded product was heated in a high frequency induction heating apparatus at 550° C., and then densification-treatment was performed in which vapor of dichloroethylene was introduced into a reaction vessel with nitrogen gas as a carrier gas, and then pores therein were filled with the produced heat-decomposed carbon.

Then, after impregnation of a-pitch, the C/C composite material was carbonized in a heating furnace at 1000° C. Further, the same procedure of impregnation-carbonization was repeated, and then heat treatment at 2000° C. was performed to obtain a C/C composite of the present invention having a porosity of 13%.

The compression strength, tensile strength and friction coefficient of the C/C composite are shown in Table 1.

Example 2

A C/C composite having a porosity of 13% was obtained by the same method as in Example 1 using a pitch based carbon fiber having filaments which were cut-by 30 mm in length.

The compression strength, tensile strength and friction coefficient of the obtained C/C composite are shown in Table 1.

TABLE 1

|  | 1) Tensile strength (Kg/mm²) | 2) Compression strength (//) (Kg/mm²) | 3) Compression strength (⊥) (Kg/mm²) | Number of friction (times) | Friction coefficient (μ) | 4) Wear (μm/stop/ surface) |
|---|---|---|---|---|---|---|
| Example 1 | 7.7 | 17 | 11 | 100 | 0.21 $\sigma = 7 \times 10^{-3}$ | 0.17 |
| Example 2 | 7.8 | 21 | 13 | 100 | 0.19 $\sigma = 5 \times 10^{-3}$ | 0.30 |

Note:
1) Tensile strength in the parallel direction to a lamination plane thereof was measured according to JIS K-6911.
2) Compression strength (//) in the longitudinal direction to a lamination plane thereof was measured according to JIS K-7208.
3) Compression strength (⊥) in the parallel direction to a lamination plane thereof was measured according to JIS K-7208.
4) At a rotation speed of 5,000 rpm under the pressure of 10 Kg/cm².

What is claimed is:

1. A method for preparing carbon fiber-reinforced carbon composites comprising the steps of:

(a) subjecting carbon fibers of 0.3 to 100 mm in length, composed of bundles of single fibers, to dry or wet fibrillation;

(b) preparing a carbon fiber sheet by orienting said carbon fibers in the planar direction while the carbon fibers remain randomly oriented in the other two directions, wherein the sheet has a carbon fiber weight per area of 10 to 500 g/m²;

(c) impregnating the prepared sheet with a matrix of resins or pitches;

(d) laminating the impregnated sheet to produce a laminate;

(e) molding the laminate to obtain a molded product;

(f) baking the molded product to obtain a composite material; and (g) subjecting the baked composite material to a densification treatment.

2. The method according to claim 1, wherein the densification treatment comprises placing the baked composite material into a vessel, reducing the inner pressure of the vessel, impregnating voids which have been produced by baking the baked composite material with a matrix of resins or melt pitches, and baking the thus impregnated composite material at a temperature of 800° to 2500° C.

3. The method according to claim 1, wherein the densification treatment comprises placing the baked composite material into a vessel which is heated, supplying hydrocarbon or halogenated hydrocarbon vapor to the heated vessel with $H_2$ gas, Ar gas or $N_2$ gas to produce heat-decomposed carbons and impregnating voids which have been produced by baking the baked composite material with the produced heat-decomposed carbons.

4. The method according to claim 1, wherein said carbon fiber is at least one selected from the group consisting of pitch based carbon fibers, PAN based carbon fibers and rayon based carbon fibers.

5. The method according to claim 1, wherein dry fibrillation is a mechanical fibrillation or a fibrillation with air.

6. The method according to claim 1, wherein wet fibrillation is performed in a solvent using a beater or a pulper.

7. The method according to claim 6, wherein said solvent is water, acetone, alcohols having carbon atoms of 1 to 5, or anthracene oil.

8. The method according to claim 6, wherein at least one of phenol resins, furan resins or pitches is dispersed or dissolved in said solvent.

9. The method according to claim 1, wherein said sheet is impregnated with a matrix of phenol resins, furan resins, petroleum pitches or coal pitches dissolved in alcohols having carbon atoms of 1 to 5 or anthracene oil.

10. The method according to claim 1, wherein said laminate is subjecting to pressure molding to obtain a molded product having a fiber content ($V_f$) of 5–65% by volume.

11. The method according to claim 1, wherein said molded product is baked by elevating the temperature up to 800°–2500° C. at a temperature-increasing rate of 1°–200° C./h in an inert gas.

12. The method according to claim 1, wherein said oriented sheet is impregnated with the matrix of 1 to 3,000 g/m² based on 200 g/m² of the sheet which is not impregnated.

* * * * *